(12) United States Patent
Kang

(10) Patent No.: US 7,131,215 B2
(45) Date of Patent: Nov. 7, 2006

(54) TAPE MEASURE HAVING FINGER PROTECTION FUNCTION

(75) Inventor: Dong-Hun Kang, Pusan (KR)

(73) Assignee: Komelon Corporation, Pusan (KR)

( * ) Notice: Subject to any disclaimer, the term of this patent is extended or adjusted under 35 U.S.C. 154(b) by 0 days.

(21) Appl. No.: 11/126,860

(22) Filed: May 10, 2005

(65) Prior Publication Data

US 2005/0252021 A1    Nov. 17, 2005

(30) Foreign Application Priority Data

May 12, 2004   (KR)   ...................... 10-2004-0033557

(51) Int. Cl.
*G01B 3/10*   (2006.01)
(52) U.S. Cl. .............................. 33/769; 33/760; 33/770
(58) Field of Classification Search .................. 33/755, 33/757, 759–766, 768–770
See application file for complete search history.

(56) References Cited

U.S. PATENT DOCUMENTS

| | | | |
|---|---|---|---|
| 5,134,784 A * | 8/1992 | Atienza | ........................ 33/668 |
| 6,497,050 B1 | 12/2002 | Ricalde | |
| 6,691,425 B1 | 2/2004 | Lee et al. | |
| 6,691,426 B1 | 2/2004 | Lee et al. | |
| 6,976,318 B1 * | 12/2005 | Odachowski | ................. 33/759 |
| 6,996,915 B1 * | 2/2006 | Ricalde | ....................... 33/770 |

* cited by examiner

*Primary Examiner*—Yaritza Guadalupe-McCall
(74) *Attorney, Agent, or Firm*—DeLio & Peterson, LLC; Peter W. Peterson

(57) ABSTRACT

Disclosed herein is a tape measure which has at least one roller provided in the front surface of a housing, thus protecting the fingers of a user. The tape measure of the present invention includes a housing, a circumferential outer surface of which is covered with a grip. The housing has a neck extending from the front surface of the housing, thus forming upper and lower concave parts on upper and lower surfaces of the neck, respectively. The housing further has a tape extraction hole formed in a lower end of the front surface of the neck. The tape measure further includes a bobbin rotatably provided at a central portion in the housing, with a coil spring mounted in the bobbin; and a tape coupled at a first end thereof to the coil spring of the bobbin and extending at a second end thereof to the outside of the housing through the tape extraction hole, so that the tape is extracted to the outside through the tape extraction hole. The tape measure further includes an end hook which has an L shape and is coupled to the second end of the tape by a locking means, with a support hook, having an upwardly bent piece provided on the end hook.

11 Claims, 11 Drawing Sheets

TAPE MEASURE HAVING FINGER PROTECTION FUNCTION

BACKGROUND OF THE INVENTION

1. Field of the Invention

The present invention relates generally to tape measures and, more particularly, to a tape measure having a finger protection function which has at least one roller in a front surface of a housing, so that a user grips the housing such that his/her index finger is seated in a finger seat formed in the housing and the user moves the housing along a front edge of an object to be measured such that the roller is in contact with the front edge of the object, thus ensuring smooth movement of the housing and safety of the user's finger.

2. Description of the Related Art

Generally, tape measures include a tape which is coupled to a spring in a housing and is wound around a bobbin in a coil shape, and an end hook which is coupled to an end of the tape and exposed to the outside through a tape extraction hole which is formed in a lower end of a front surface of the housing. Thus, when a user grips the end hook and pulls it outwards, the tape is extracted to the outside of the housing. In the above state, if the user releases the end hook, the tape, which was extracted, is retracted into the housing by the elasticity of the spring.

Some tape measures further include a tape locking means which prevents a tape, extracted outside a housing, from being completely retracted into the housing by the elasticity of a spring even when extracting tension applied to an end hook is discontinued.

In conventional tape measures having the above-mentioned construction, a housing has a circular or rectangular shape and a size appropriate for a user to grip the housing with one hand. To use a tape measure, the user grips a grip, which is provided around the outside surface of the housing, using his/her palm and fingers, and controls a tape locking means of the housing using the thumb to adjust the length of the tape extracted to the outside of the housing through a tape extraction hole.

Such a conventional tape measure has a basic function of measuring the length of a desired portion of an object, and, in addition, the tape measure may be used as a subsidiary means for cutting an object or drawing a line on the object while working.

Furthermore, according to the individual preferences or habits of various users using the tape measure, there are a variety of methods to measure the length of a desired portion of the object or mark the measured length on the object. Representative example of the usage of the tape measure follows.

First, to measure the length of a desired portion of an object to be measure, a user grips the grip of the housing of the tape measure with one hand and holds the end hook with the other hand and pulls the end hook outwards to extract the tape to an appropriate length. Subsequently, the user hooks the end hook to a predetermined portion of the object and reads a numeral, written on a part of the tape corresponding to a desired position on the object to be measured, thus measuring the length of the desired portion of the object to be measured.

To measure the length of a desired portion of the object and simultaneously draw a line corresponding to the measured length on the object, the user places the thumb and index finger of the hand gripping the grip of the housing in front of the tape extraction hole, that is, between the tape extraction hole and a facing edge of the object, in order to hold the tape using the thumb and index finger. Thereafter, a separate marking means (a pen or a cutter, etc.) is brought into close contact with the outer surface of the end hook, and then, the user moves the marking means on the object in a direction perpendicular to the tape while moving the housing along the facing edge of the object.

Here, the reason for moving the thumb and index finger of the hand gripping the housing and the reason for holding the tape with the thumb and index finger is that when the index finger is in close contact with the facing edge of the object during the line marking operation, the housing is prevented from undesirably moving and the extracted length of the tape is maintained. As a result, precise line marking can be conducted.

However, in such a method of drawing a line corresponding to the measured length on the object or cutting the object, the index finger of the user is in close contact with the facing edge of the object and moves along the facing edge. Therefore, if the facing edge of the object is rough, in particular, in the case of the object made of wood, the index finger may be injured by a sliver protruding from the facing edge of the object.

In an effort to overcome the problems with conventional tape measures, a tape measure having a marking gauge that is removably provided between a tape extraction hole formed in the front surface of a housing and an end hook provided on the extracted end of a tape and slides along the tape, was proposed in U.S. Pat. No. 6,497,050. However, the purpose of the marking gauge of the tape measure, which slides along the tape between the tape extraction hole of the housing and the end hook provided on the end of the tape, is to improve a marking ability of a user rather than to protect a user's finger. Therefore, the tape measure of U.S. Pat. No. 6,497,050 cannot achieve the fundamental purpose of protecting the user's finger.

Furthermore, because the marking gauge is easily removed from the tape, there is a problem in that the marking gauge may become lost.

In addition, only the end hook, which is bent downwards in an L-shape, is provided on the extracted end of the tape which is extracted outside the housing through the tape extraction hole. Therefore, to measure the length of a desired portion of an object and, thereafter, mark the measured length on the object with a marking means, a user must grip the housing with one hand and hold both the marking means and the end hook with the other hand. As such, because the marking means is not firmly fastened to the end hook, the marking operation is difficult.

To solve the above-mentioned problems, other tape measures were proposed in U.S. Pat. Nos. 6,691,425 and 6,691,426. These tape measures each have a separate hook, which includes a horizontal plate and a vertical plate that are perpendicular to each other and are integrated into a single body, to replace a typical end hook having the L-shape. These tape measures are manufactured merely by partially modifying the structure of end hooks provided on the extracted end of the tape of tape measures of the prior art. To use these tape measures, a user holds both a pen or cutter and the vertical plate, which perpendicularly extends from the horizontal plate coupled to the end of the tape, and then, the user marks a line on an object.

When it is desired to mark a line on the object, the extracted tape is locked by a tape lock provided on the front surface of the housing, and the front end of the housing having the tape extraction hole is brought into close contact with a facing edge of the object. However, in such a method of marking a line, there is difficulty in maintaining a constant measured length while marking the line. Furthermore, the tape may undesirably bend when the housing is moved along the edge of the object. These problems make it difficult to draw a straight line.

SUMMARY OF THE INVENTION

Accordingly, the present invention has been made keeping in mind the above problems occurring in the prior art, and an object of the present invention is to provide a tape measure, having a finger protection function, which has a finger seat that is provided on a lower surface of a neck of the housing to allow a user to grip the housing through the finger seat, and at least one roller that is provided on a front surface of the housing below a tape extraction hole such that a part of the roller is exposed to the outside, so that, when the housing moves along a facing edge of an object to be measured, the roller is in contact with the facing edge of the measurement object, thus ensuring the smooth movement of the housing and the safety of the user's finger.

Another object of the present invention is to provide a tape measure in which a support hook having an upwardly bent piece is provided on an end hook coupled to an extracted end of a tape by a locking means, so that the user may easily hold both the support hook and a marking means, such as a pen or cutter, placed on the outer surface of the end hook.

In order to accomplish the above object, the present invention provides a tape measure having a finger protection function, including: a housing, a circumferential outer surface of which is covered with a grip, and which has a neck extending from the front surface of the housing, thus forming upper and lower concave parts on upper and lower surfaces of the neck, respectively, and which has a tape extraction hole formed in a lower end of the front surface of the neck; a bobbin rotatably provided at a central portion in the housing, with a coil spring mounted in the bobbin; a tape coupled at a first end thereof to the coil spring of the bobbin and extending at a second end thereof to the outside of the housing through the tape extraction hole, so that the tape is extracted to the outside through the tape extraction hole; and an end hook which has an L shape and is coupled to the second end of the tape by a locking means, such as a rivet, with a support hook, having an upwardly bent piece, provided on the end hook.

The housing may include: a flat cylindrical shape so that a user can hold the housing with one hand; the neck having the tape extraction hole in the front surface thereof and extending from the front surface of the housing, thus forming upper and lower concave parts on upper and lower surfaces of the neck, respectively; and a finger seat provided in the lower concave part of the neck.

The tape measure may further include at least one roller rotatably provided in the front surface of the neck of the housing below the tape extraction hole such that part of the roller is exposed to the outside from the front surface of the neck. The roller is in close contact with the front edge of an object to be measured and rotates in a predetermined direction according to the movement direction of the housing.

The support hook having the upwardly bent piece may be coupled to both the second end of the tape and the end hook by a separate means, so that a user can hold both the upwardly bent piece of the support hook and a marking means, such as an industrial cutter or pen, using his/her hand.

The tape may have a scale on each of both surfaces thereof so that both surfaces of the tape may be used to measure a desired portion of the object.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the construction, operation and effect of a tape measure having a finger protection function according to a preferred embodiment of the present invention will be described herein below with reference to the attached drawings.

Figure 1:
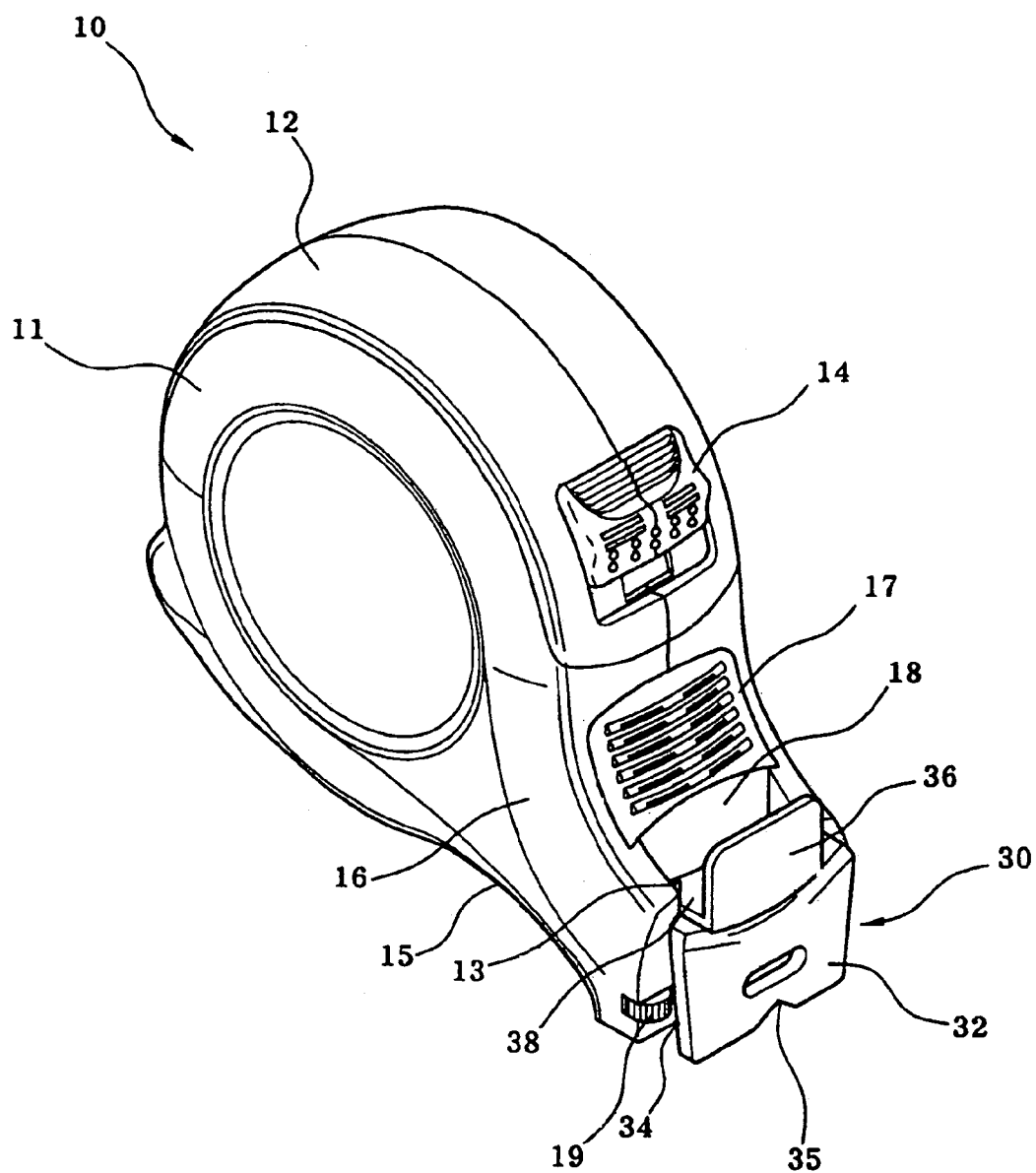
FIG. 1 is a perspective view of a tape measure having a finger protection function, according to a preferred embodiment of the present invention.
Figure 2:
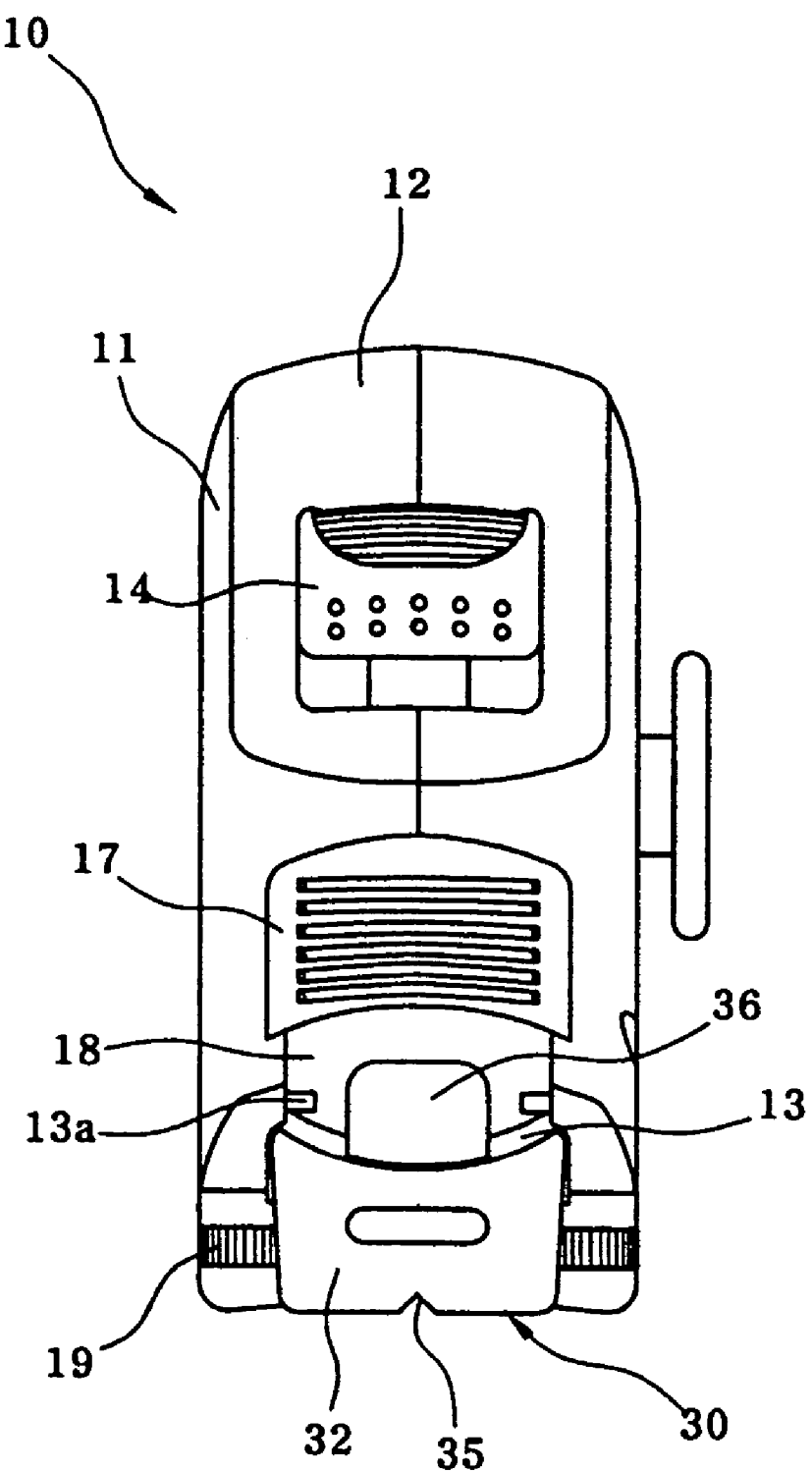
FIG. 2 is a front view of the tape measure of FIG. 1.
Figure 3:
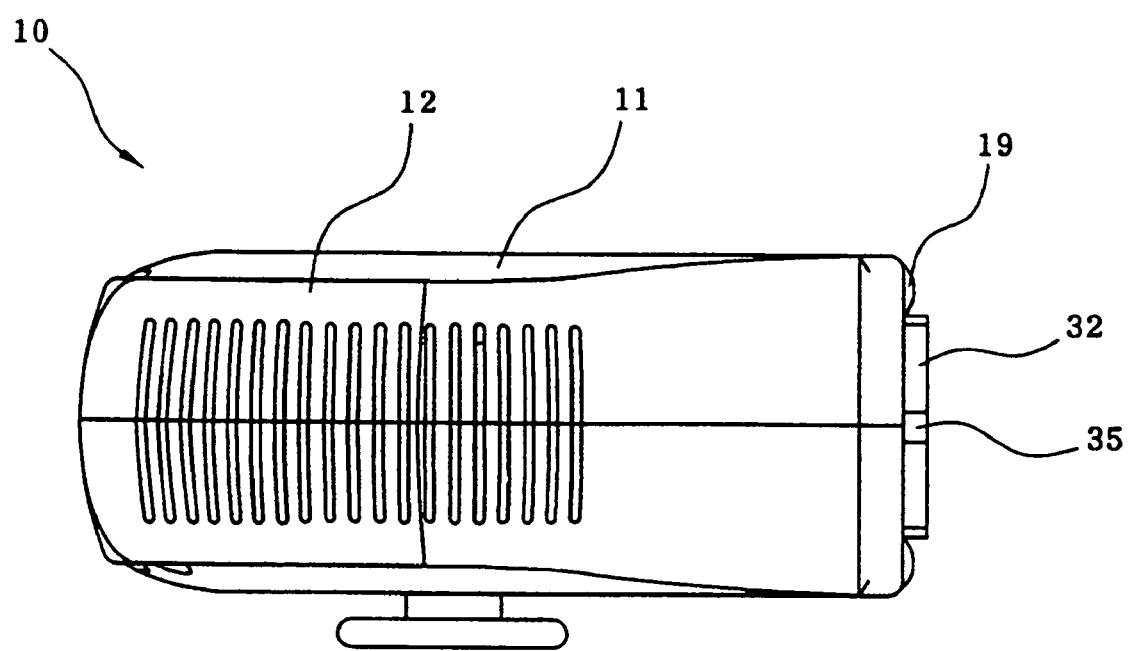
FIG. 3 is a bottom view of the tape measure of FIG. 1.
Figure 4:
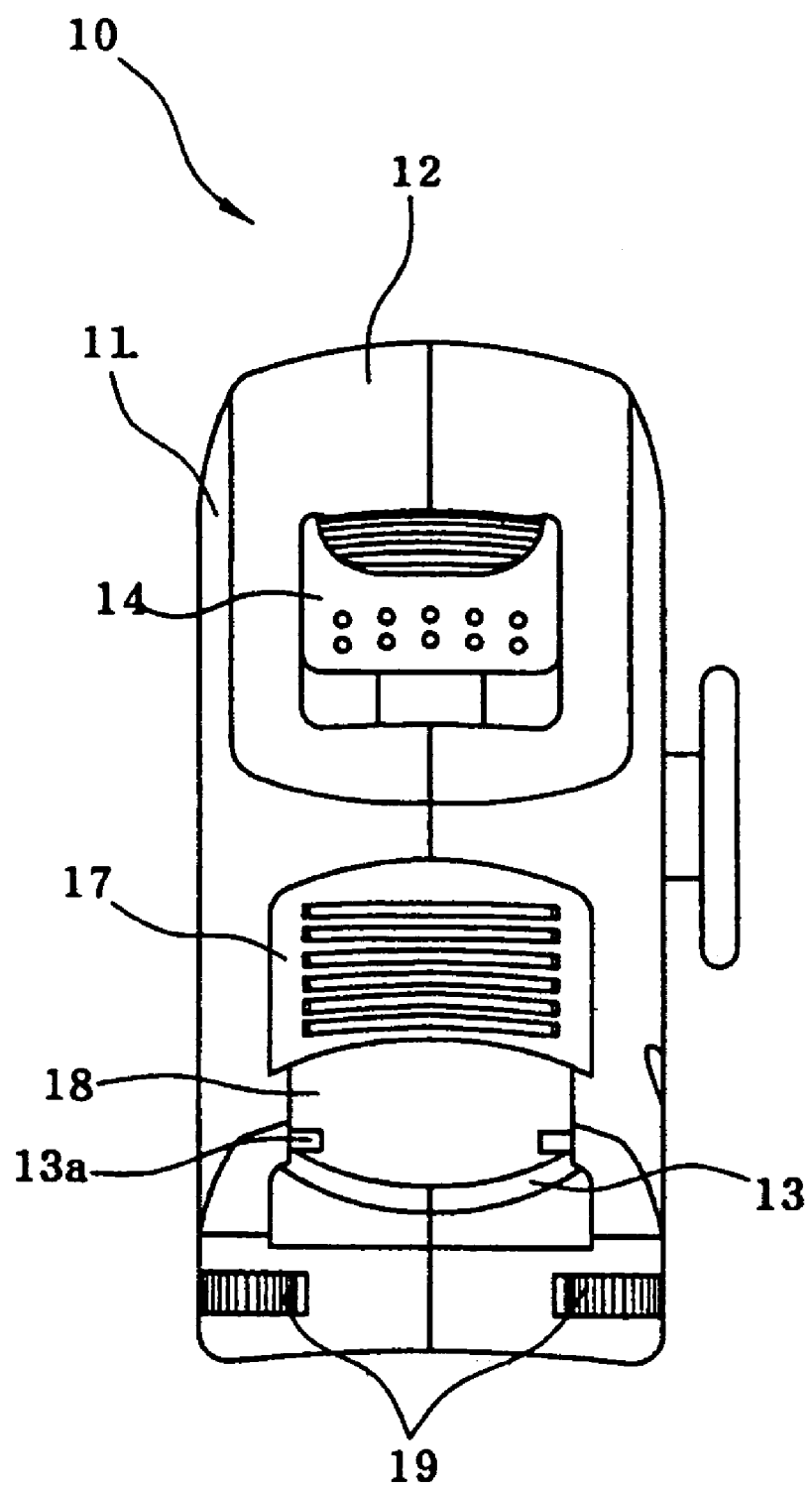
FIG. 4 is a view corresponding to FIG. 2, but showing the tape measure from which-an end hook is removed.
Figure 5:
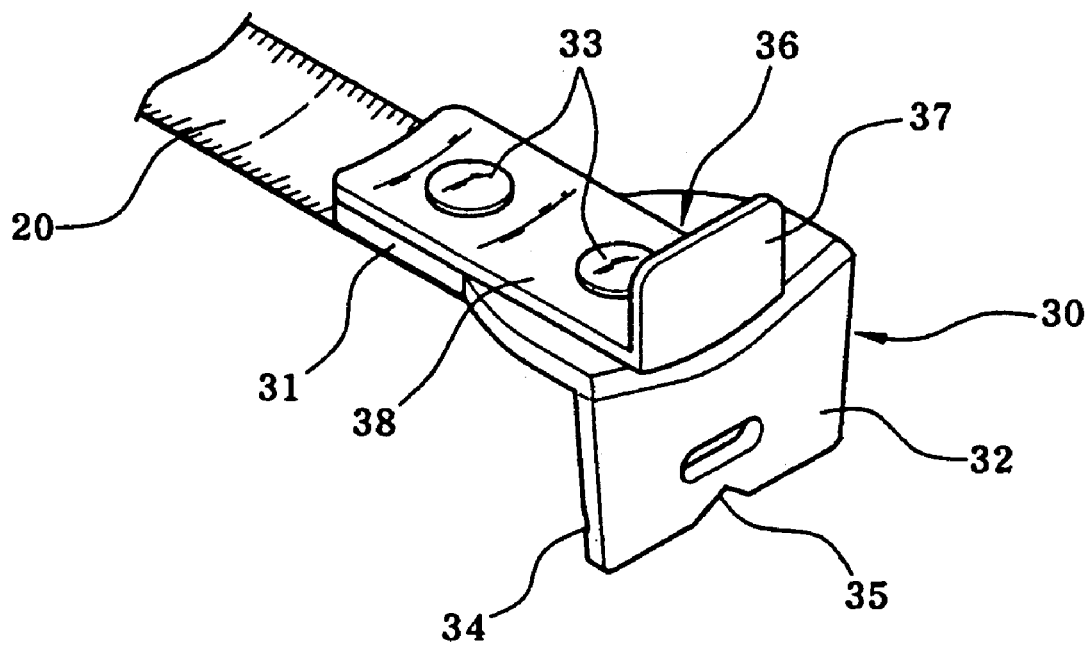
FIG. 5 is a partial perspective view showing an enlargement of an end of a tape to be extracted from the tape measure according to the present invention.
Figure 6:
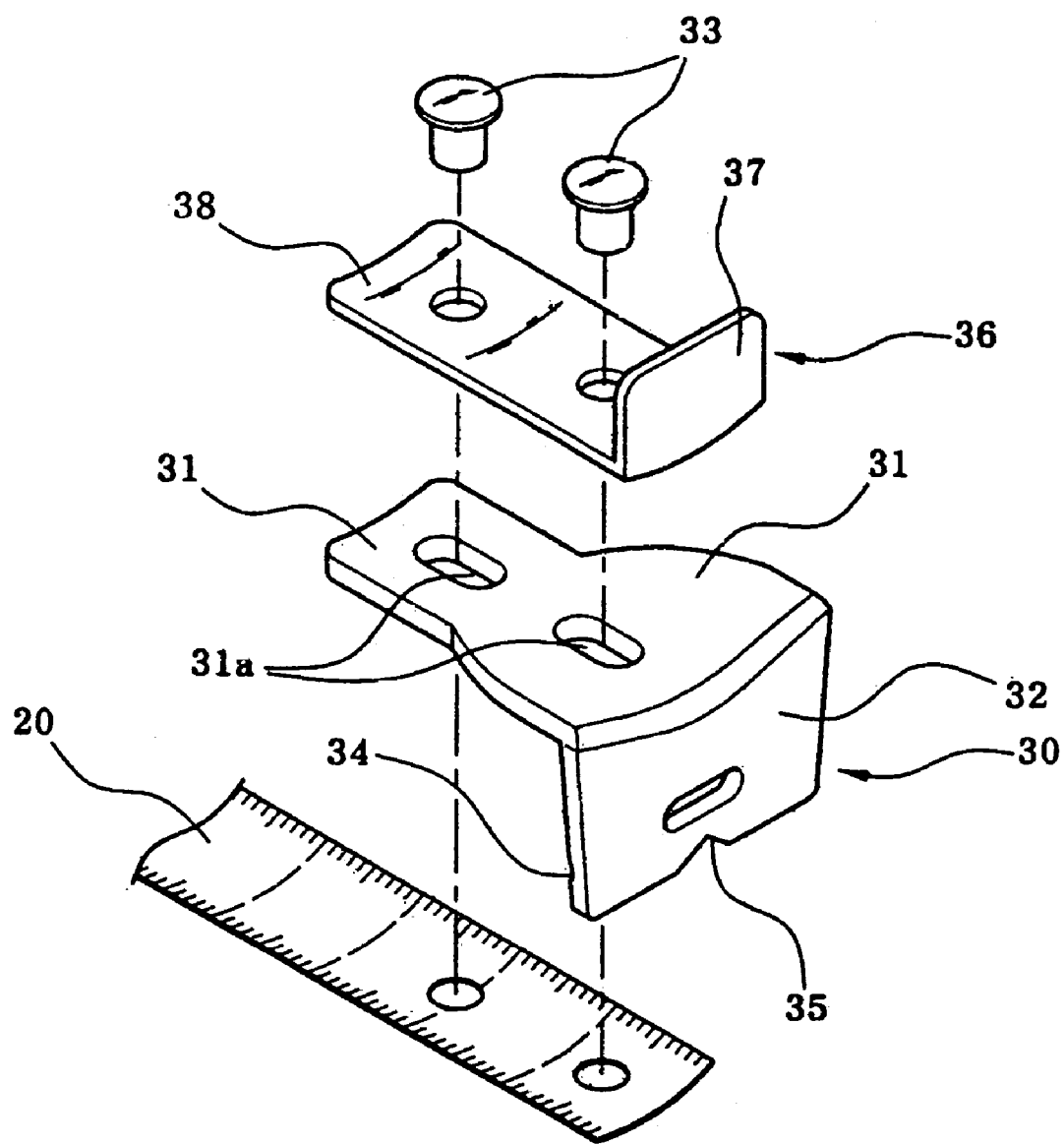
FIG. 6 is an exploded perspective view showing the end of the tape of FIG. 5.

FIG. 1 is a perspective view of a tape measure 10 having a finger protection function, according to a preferred embodiment of the present invention. FIG. 2 is a front view of the tape measure 10 of FIG. 1. FIG. 3 is a bottom view of the tape measure 10 of FIG. 1. FIG. 4 is a view corresponding to FIG. 2, but showing the tape measure 10 from which an end hook 30 has been removed. FIG. 5 is a partial perspective view showing an enlargement of an end of a tape 20 to be extracted from the tape measure 10 according to the present invention. FIG. 6 is an exploded perspective view showing the end of the tape 20 of FIG. 5.

As shown in FIGS. 1 through 6, the tape measure 10 having a finger protection function according to the preferred embodiment of the present invention includes a housing 11, a circumferential outer surface of which is covered with a grip 12 made of rubber. The housing 11 has a tape extraction hole 13, which is formed in a lower end of a front surface of the housing 11, and through which the tape 20 is extracted and retracted. The housing 11 further has a tape lock 14 which is provided above the tape extraction hole 13 on the housing 11 to hold a portion of the tape 20 extracted to the outside. The tape measure 10 further includes a bobbin (not shown) which is rotatably provided at a central portion in the housing 11. A coil spring is mounted in the bobbin of the housing 11. The tape measure 10 further includes the tape 20 which is wound around the outer surface of the bobbin and is coupled at a first end thereof to the coil spring of the bobbin. A second end of the tape 20 extends outside the housing 11 through the tape extraction hole 13. The tape measure 10 further includes the end hook 30 which is bent in an L-shape and coupled to the second end of the tape 20 by a locking means 33, such as a rivet. The tape measure 10 further includes a support hook 36 which is integrally provided on an upper surface of the end hook 30. An upwardly bent piece 37 extends a predetermined length upwards from a front end of the support hook 36 and is flush with an end surface of the end hook 30. The tape measure 10 further includes a pair of rollers 19 which are rotatably provided at both sides in the front surface of the housing 11 below the tape extraction hole 13 such that a part of the circumferential outer surface of each roller 19 is exposed to the outside.

The housing 11 has a flat cylindrical shape so that a user can hold the grip 12, provided on the circumferential outer surface of the housing 11, by bending his/her fingers. A finger seat 15 is provided in the grip 12 under the front end of the housing 11.

The housing 11 includes a neck 16 which extends from the front surface of the housing 11, thus forming upper and lower concave parts on upper and lower surfaces of the neck 16, respectively. The tape extraction hole 13, through which the tape 20 is extracted and retracted, is formed in the front surface of the neck 16. A subsidiary tape lock 17 is provided on an upper portion of the neck 16 to temporarily hold the tape 20 extracted to a predetermined length through the tape extraction hole 13.

The subsidiary tape lock 17 has a tape holding part 18 which is provided on a lower end of the subsidiary tape lock 17 and extends a predetermined length inside the neck 16 in a direction perpendicular to the tape 20. Therefore, when the tape 20 is extracted to a predetermined length to the outside, if the user pushes the subsidiary tape lock 17 downwards with the thumb, a lower end of the tape holding part 18 is in close contact with the upper surface of the tape 20, thus temporarily holding the tape 20, which is intended to be retracted into the housing 11 by the coil spring mounted in the bobbin.

Meanwhile, an indicator 13a protrudes inwards from an inner surface of the tape extraction hole 13 of the housing 11 to indicate the length of an exposed part of the tape 20, which is wound around the bobbin in the housing 11, when the tape 20 is extracted to the outside. The rollers 19, which are provided in the front surface of the housing 11 below the tape extraction hole 13 such that part of each roller 19 is exposed to the outside, are rotated by sliding friction in a lateral direction.

Thus, the rollers 19 makes it possible for the housing 11 to smoothly move along a facing edge of an object to be measured while the front surface of the neck 16 having the tape extraction hole 13 is in contact with the edge of the measurement object.

Scales of different units or the same units are printed on both surfaces of the tape 20, which is extracted and retracted through the tape extraction hole 13 provided on the front surface of the housing 11. Because the first end of the tape 20 is coupled to the coil spring mounted in the bobbin of the housing 11, the tape 20 is elastically retracted into the housing 11. The tape 20, extracted to a predetermined length, can be held by the tape lock 14 and/or the subsidiary tape lock 17 which are provided on upper and lower portions of the front surface of the housing 11, thus maintaining the extracted state. The end hook 30 having the L-shape is mounted to the second end of the tape 20, which is exposed to the outside, by the locking means 33 such as a rivet.

The end hook 30 includes an end hook fastening piece 31 which is in close contact with the upper surface of the second end of the tape 20, and a downwardly bent piece 32 which is perpendicularly bent downwards from a front end of the end hook fastening piece 31. At least one locking hole 31a is formed through the end hook fastening piece 31. The locking means 33 such as a rivet passes through both the tape 20 and the locking hole 31a of the end hook fastening piece 31, thereby the end hook 30 is fastened to the tape 20.

Furthermore, the downwardly bent piece 32 of the end hook 30 has an insert groove 34 which is formed on an inner surface of the downwardly bent piece 32 at a predetermined position corresponding to each roller 19, so that, when the tape 20, which was extracted to the outside through the tape extraction hole 13 of the housing 11, is retracted to its original state, the protruded part of the roller 19 is seated into the insert groove 34.

The support hook 36, which is provided on the end hook 30, includes the upwardly bent piece 37 which is provided on the front end of the support hook 36, and a support hook fastening piece 38 which extends rearwards from a lower end of the upwardly bent piece 37. The support hook fastening piece 38 is in close contact with the upper surface of the end hook fastening piece 31 coupled to the second end of the tape 20 and is integrated with both the end hook 30 and the tape 20 together by the locking means 33 such as a rivet.

The upwardly bent piece 37 of the support hook 36 is parallel with the downwardly bent piece 32 of the end hook 30. Therefore, when the user holds both the upwardly bent piece 37 of the support hook 36 and an industrial cutter or a pen with his/her hand such that the blade of the industrial cutter or the pen is in close contact with the outer surface of the downwardly bent piece 32 of the end hook 30, the user can cut an object or draw a line on the object.

Figure 11:
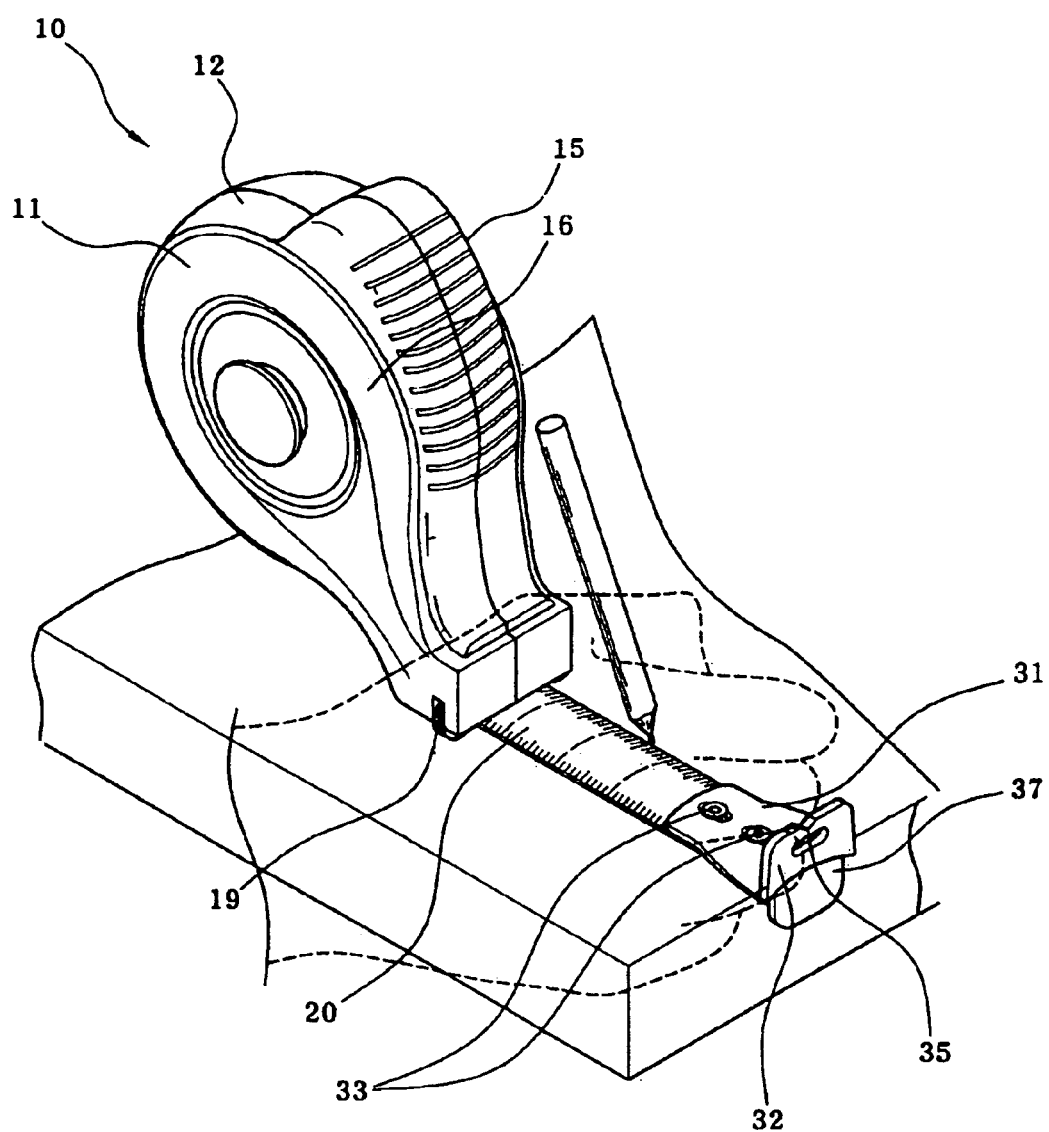
FIG. 11 is a perspective view showing a further example of the usage of the tape measure according to the present invention.

The support hook 36 serves as the end hook 30 when measuring the length of a desired portion of an object using the scale printed on the lower surface of the tape 20. In detail, as shown in FIG. 11, the tape 20 is placed on the object such that the support hook 36 is under the end hook 30, and the upwardly bent piece 37 of the support hook 36 is hooked to an edge of the object. Then, the length of a desired portion of the object can be measured using the scale printed on the lower surface of the tape 20.

Several examples of the usage of the tape measure 10 of the present invention having the above-mentioned construction will be explained herein below with reference to FIGS. 7 through 9.

Figure 7:
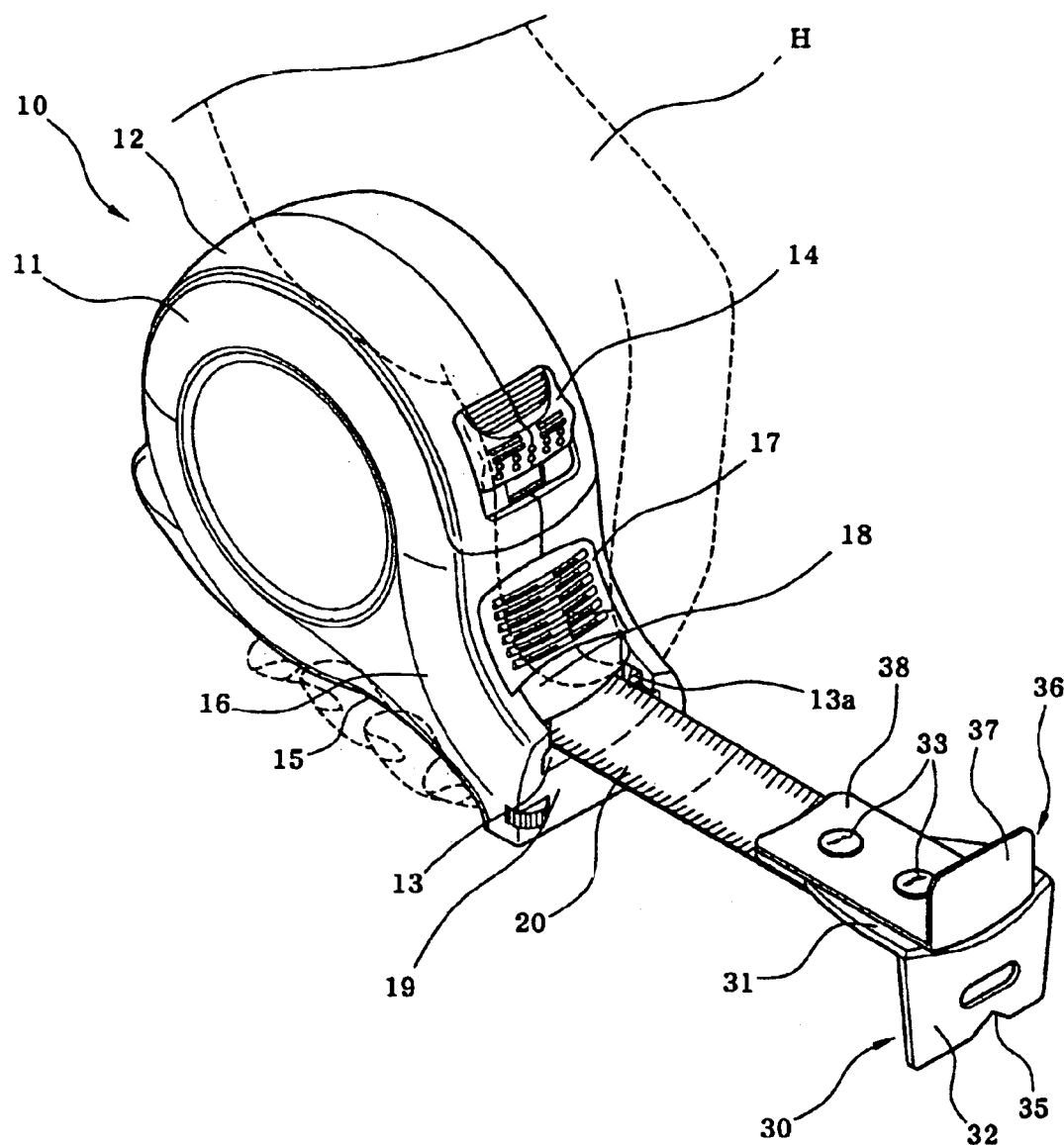
FIG. 7 is a perspective view illustrating a method of holding the tape measure of FIG. 1 with the hand.
Figure 8:
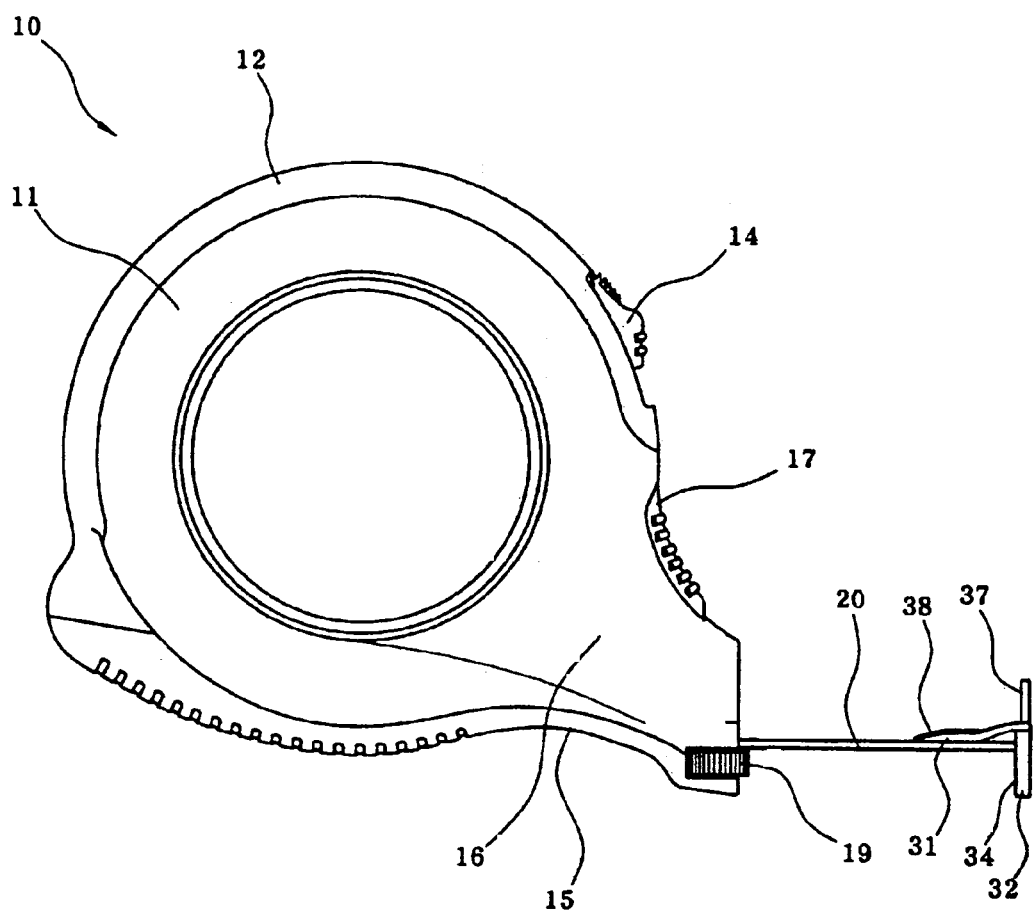
FIG. 8 is a side view of the tape measure in the state of FIG. 7.

FIG. 7 is a perspective view illustrating a method of holding the tape measure 10 with the hand. FIG. 8 is a side view of the tape measure 10 when in the state of FIG. 7. As shown in FIGS. 7 and 8, first, the user grips the grip 12, provided around the circumferential outer surface of the housing 11 of the tape measure 10, using the palm of the hand and the fingers. Thereafter, the user holds and pulls the end hook 30, which is placed in front of the tape extraction hole 13, using his/her other hand, so as to extract the tape 20 from the housing 11.

Then, the user can measure the length of a desired portion of an object to be measured using the tape 20 extracted from the housing 11. When it is desired to mark the measured length on the object, the user places the index finger of the hand, which grips the housing 11, in the finger seat 15 provided in the lower surface of the neck 16 of the housing 11. Subsequently, the user pushes the subsidiary tape lock 17, provided in the front surface of the housing 11, downwards with the thumb. Then, the tape 20 extracted to a predetermined length is compressed by the tape holding part 18 coupled to the subsidiary tape lock 17, so that the tape 20 maintains its extracted state similarly to when the user holds the tape 20 with his/her hand.

As such, while the tape 20 is extracted to the predetermined length through the tape extraction hole 13 of the housing 11, the rollers 19, which are provided below the tape extraction hole 13 in the front surface of the housing 11 such that parts of the rollers 19 protrude from the front surface of the housing 11, are in close contact with the facing edge of the object. Then, the housing 11 can smoothly move along the edge of the object due to the rotation of the rollers 19. The end hook 30 coupled to the second end of the extracted tape 20 also moves parallel to the housing 11. Thus, the user can subsequently mark the desired length on the object.

Figure 9:
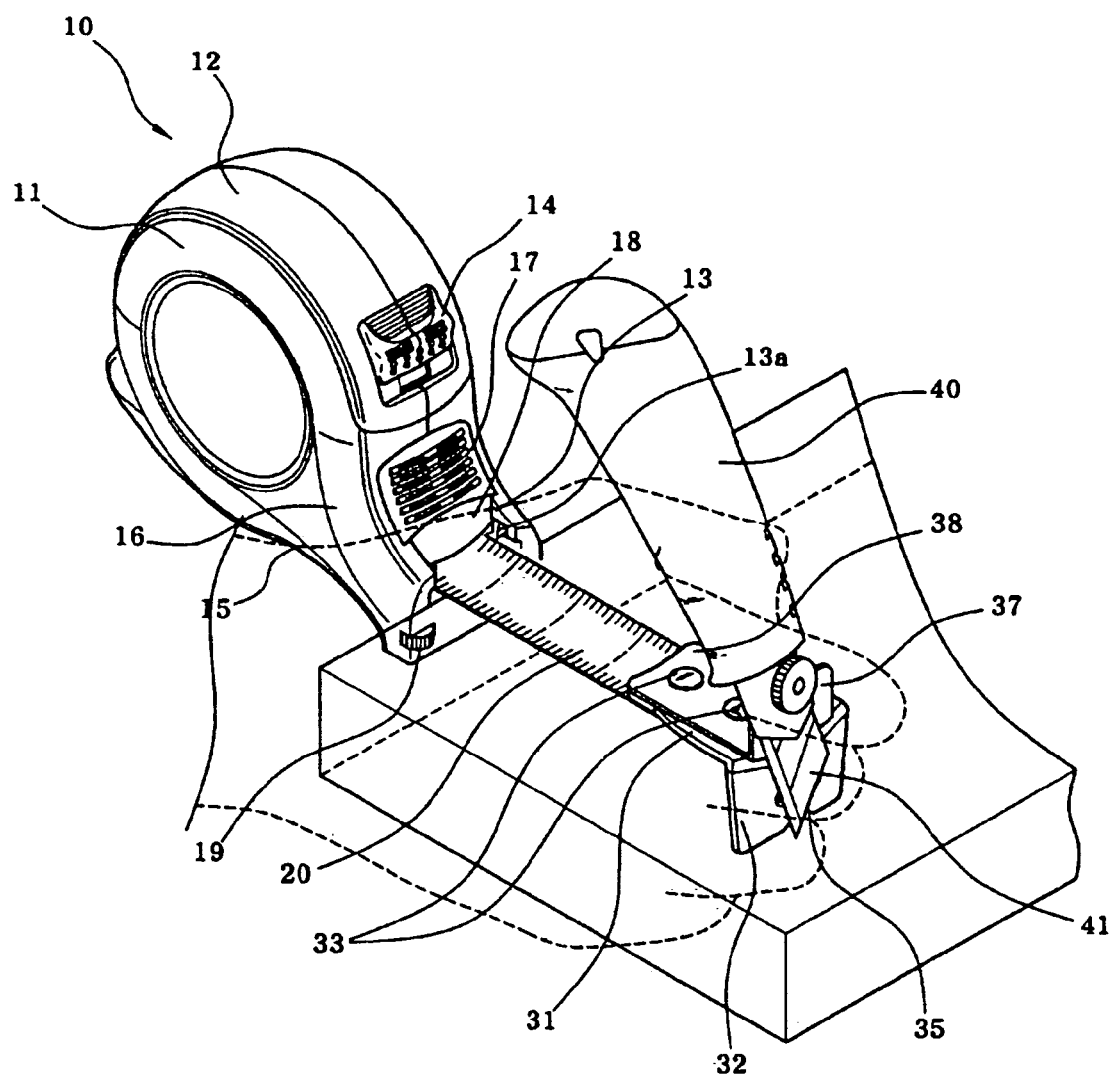
FIG. 9 is a perspective view showing an example of the usage of the tape measure according to the present invention.

When it is desired to cut the object to the measured length, as shown in FIG. 9, a blade 41 of an industrial cutter 40 is brought into close contact with the outer surface of the downwardly bent piece 32 of the end hook 30 such that an end point of the blade 41 is placed inside a triangular guide notch 35 which is formed on an intermediate portion of the lower end of the downwardly bent piece 32. Thereafter, the user holds both the body of the cutter 40 and the upwardly bent piece 37 of the support hook 36 and cuts the object or marks a cutting line on the object using the blade 41 of the cutter 40.

Figure 10:
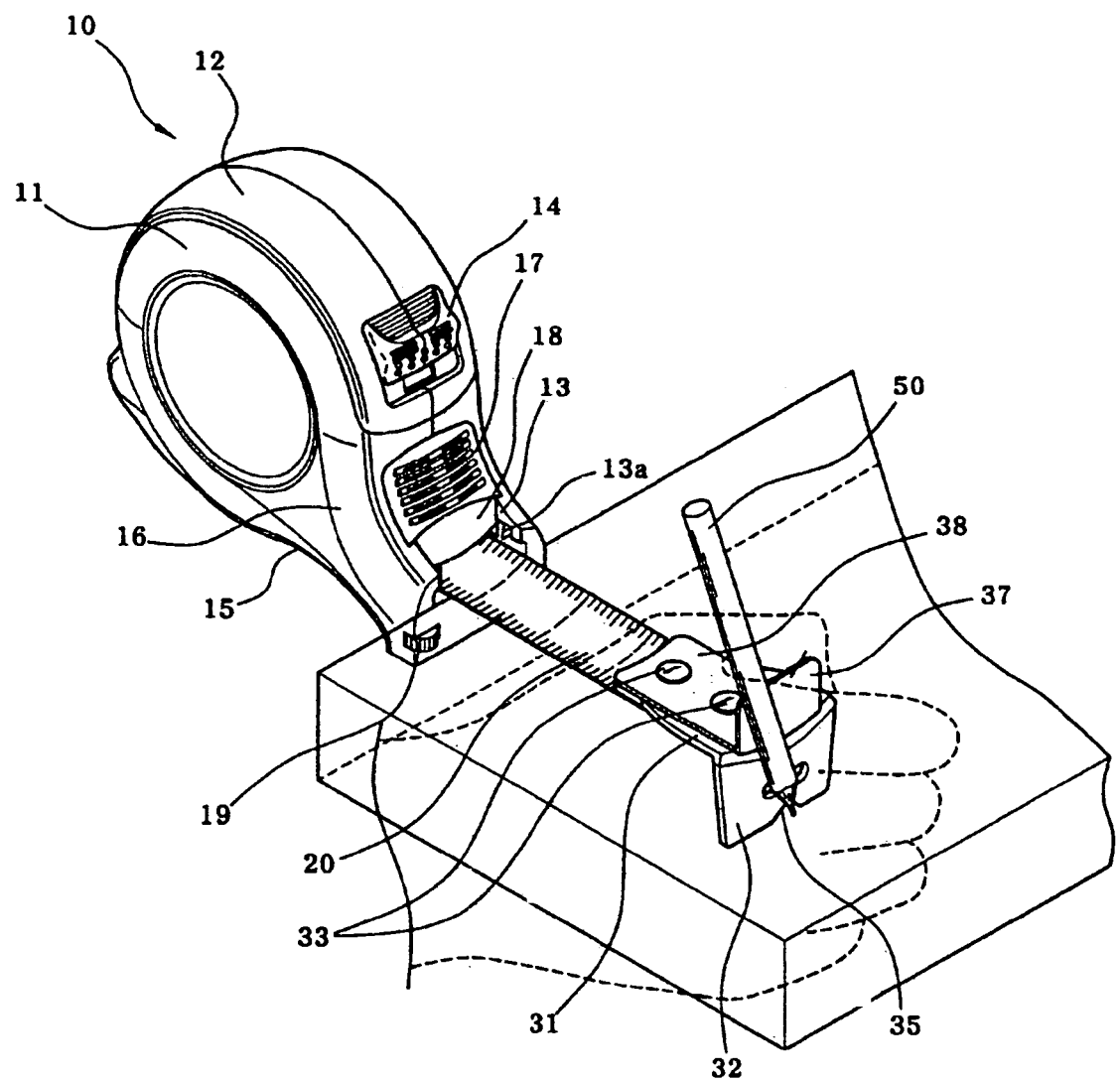
FIG. 10 is a perspective view showing another example of the usage of the tape measure according to the present invention.

Furthermore, when it is desired to draw a line on a measurement surface of the object using a pen 50, as shown in FIG. 10, the pen 50 is placed on the outer surface of the end hook 30 such that the point of the pen 50 is positioned inside the guide notch 35 which is formed on the intermediate portion of the lower end of the downwardly bent piece 32 of the end hook 30. Thereafter, the pen 50 is moved along with the end hook 30 in a lateral direction by the movement of the housing 11 along the edge of the object during the rotation of the rollers 19. Thus, a line is marked on the object.

Here, because the guide notch 35 of the downwardly bent piece 32 has a triangular shape, when the user conducts the cutting or line marking operation after placing the end point of the blade 41 or the pen 50 inside the guide notch 35, the blade 41 of the cutter or the pen 50 is prevented from undesirably moving.

FIG. 11 is a perspective view showing another example of the usage of the tape measure 10 according to the present invention. As shown in FIG. 11, in the tape measure 10 of the present invention, the scale printed on the lower surface of the tape 20 may be used to measure the length of a desired portion of an object. That is, the tape 20 is placed on the object such that the support hook 36 is under the end hook 30, and thereafter, the upwardly bent piece 37 of the support hook 36 is hooked to an edge of the object. Then, the user can measure the length of a desired portion of the object using the scale printed on the lower surface of the tape 20, which is extracted to a predetermined length through the tape extraction hole 13.

As described above, the present invention provides a tape measure having a finger protection function which includes at least one roller that is provided in a front surface of a housing below a tape extraction hole and is in close contact with a facing edge of a measurement object, and a finger seat that is provided in a concave part formed along a lower surface of a neck of the housing. Accordingly, the present invention prevents the index finger of a user from coming into contact with the edge of the measurement object, thus protecting the user's finger.

Furthermore, the tape measure of the present invention make it possible for a user to hold both a variety of marking means and an upwardly bent piece of a support hook coupled to the upper surface of an end hook and smoothly move the housing using the rotation of a roller. Therefore, the user can easily mark the measurement length on the upper surface of the measurement object.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A tape measure having a finger protection function, comprising:
   a housing, comprising:
   a tape extraction hole formed in a lower end of a front surface of the housing; and
   a tape lock provided above the tape extraction hole on the housing;
   a bobbin rotatably provided at a central portion in the housing, with a coil spring mounted in the bobbin;
   a tape coupled at a first end thereof to the coil spring of the bobbin and extending at a second end thereof to an outside of the housing through the tape extraction hole, so that the tape is extracted to the outside through the tape extraction hole and held at a predetermined position by the tape lock; and
   an end hook coupled to the second end of the tape wherein the tape measure further comprises:
   a neck extending from the front surface of the housing, thus forming upper and lower concave parts on upper and lower surfaces of the neck, respectively, with a finger seat provided in the lower concave part of the neck; and
   at least one roller rotated by sliding friction in a lateral direction and provided in the front surface of the neck of the housing below the tape extraction hole such that a part of the roller is exposed to the outside from the front surface of the neck.

2. The tape measure according to claim 1, wherein the neck comprises: a subsidiary tape lock provided on the upper surface of the neck to temporarily hold the tape extracted to a predetermined length through the tape extraction hole.

3. The tape measure according to claim 1, further comprising: an indicator protruding inwards from an inner surface of the tape extraction hole to indicate a length of a part of the tape which is extracted to the outside.

4. A tape measure having a finger protection function, comprising:
   a housing, comprising:
   a tape extraction hole formed in a lower end of a front surface of the housing; and
   a tape lock provided above the tape extraction hole on the housing;
   a bobbin rotatably provided at a central portion in the housing, with a coil spring mounted in the bobbin;
   a tape coupled at a first end thereof to the coil spring of the bobbin and extending at a second end thereof to an outside of the housing through the tape extraction hole, so that the tape is extracted to the outside through the tape extraction hole and held at a predetermined position by the tape lock; and an end hook coupled to the second end of the tape wherein the tape measure further comprises:

a neck extending from the front surface of the housing, thus forming upper and lower concave parts on upper and lower surfaces of the neck, respectively, with a finger seat provided in the lower concave part of the neck;

at least one roller rotated by sliding friction in a lateral direction with respect to direction of extraction of the tape and provided on the front surface of the neck of the housing below the tape extraction hole such that a part of the roller is exposed to the outside from the front surface of the neck to contact and move the housing along a facing edge of an object to be measured; and a support hook provided on an upper surface of the end hook, with an upwardly bent piece provided at a front end of the support hook to correspond to a downwardly bent piece provided at a front end of the end hook.

5. The tape measure according to claim 4, wherein the downwardly bent piece comprises: a triangular guide notch formed on an intermediate portion of a lower end of the downwardly bent piece.

6. The tape measure according to claim 4, wherein the tape has a scale on each of both surfaces thereof.

7. A tape measure having a finger protection function, comprising:

a housing, comprising:

a tape extraction hole formed in a lower end of a front surface of the housing; and a tape lock provided above the tape extraction hole on the housing;

a bobbin rotatably provided at a central portion in the housing, with a coil spring mounted in the bobbin;

a tape coupled at a first end thereof to the coil spring of the bobbin and extending at a second end thereof to an outside of the housing through the tape extraction hole, so that the tape is extracted to the outside through the tape extraction hole and held at a predetermined position by the tape lock; and an end hook coupled to the second end of the tape by locking means, such as a rivet, wherein the tape measure further comprises:

a neck extending from the front surface of the housing forming upper and lower concave parts on under and lower surfaces of the neck, respectively, with a finger seat provided in the lower concave part of the neck, with the tape extraction hole being formed in a lower end of a front surface of the neck, to prevent a finger of a user from coming in contact with an edge of a measured object.

8. The tape measure according to claim 7, further comprising: at least one roller rotated by sliding friction in a lateral direction with respect to direction of extraction of the tape and provided on the front surface of the neck of the housing below the tape extraction hole such that a part of the roller is exposed to the outside from the front surface of the neck to contact and move the housing along a facing edge of an object to be measured.

9. The tape measure according to claim 8, wherein the neck comprises: a subsidiary tape lock provided on the upper surface of the neck to temporarily hold the tape extracted to a predetermined length through the tape extraction hole.

10. The tape measure according to claim 7, wherein the neck comprises: a subsidiary tape lock provided on the upper surface of the neck to temporarily hold the tape extracted to a predetermined length through the tape extraction hole.

11. The tape measure according to claim 7, wherein the tape has a scale on each of both surfaces thereof.

* * * * *